Figure 1:
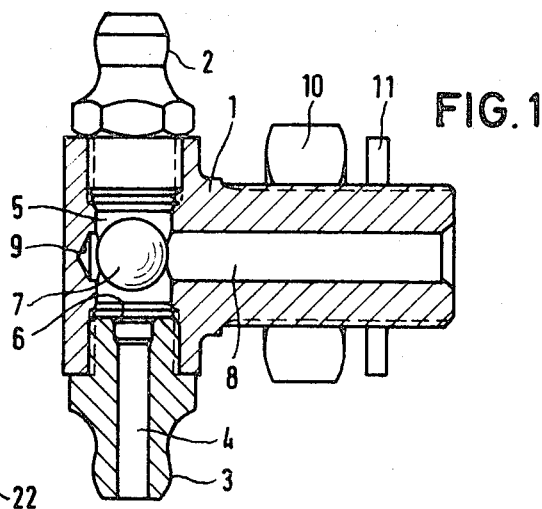

United States Patent [19]
Klüh

[11] 3,756,349
[45] Sept. 4, 1973

[54] VALVE FOR LUBRICATING AND VENTING MACHINE PARTS SUBJECT TO WEAR

[75] Inventor: Emil Klüh, Essen-Steele, Germany

[73] Assignee: Gelenkwellenbau GmbH, Essen, Germany

[22] Filed: Nov. 10, 1971

[21] Appl. No.: 197,296

[30] Foreign Application Priority Data
Nov. 9, 1973 Germany............P 20 55 066.7

[52] U.S. Cl. ......................... 184/105 B, 137/519.5
[51] Int. Cl............................................. F16n 37/00
[58] Field of Search ................... 184/105 B, 105 C; 137/102, 111, 112, 519.5

[56] References Cited
UNITED STATES PATENTS

| | | | |
|---|---|---|---|
| 1,080,027 | 12/1913 | Van Sinderen | 137/112 X |
| 2,539,989 | 1/1951 | Campbell | 184/105 B |
| 172,934 | 2/1876 | Prall | 137/112 X |
| 2,604,958 | 7/1952 | Leufvenius | 184/105 B |
| 2,611,450 | 9/1952 | Kalikow | 184/105 B |

FOREIGN PATENTS OR APPLICATIONS
386,787   4/1965   Switzerland..................... 184/105 B Primary Examiner—Manuel A. Antonakas
Attorney—Donal E. McCarthy, William E. O'Brien et al.

[57] ABSTRACT

There is disclosed a valve for lubricating and venting machine parts subject to wear, in particular a splined shaft connection, by a pressurized lubricant, wherein a valve is provided having a grease nipple disposed at the valve body and has a first passage, and a second passage is provided connecting the valve chamber with the ambient atmosphere, the outlet opening of the valve being arranged between the openings of the passages into the valve chamber, and a valve ball is provided which is freely movable in the valve chamber and capable of entering into sealing engagement with either one of the seats surrounding the opening of each of the passages in response to pressure admission on said ball.

5 Claims, 4 Drawing Figures

PATENTED SEP 4 1973　　3,756,349

VALVE FOR LUBRICATING AND VENTING MACHINE PARTS SUBJECT TO WEAR

This invention relates to a valve for lubricating machine parts subject to wear, especially a splined shaft connection, by means of pressurized lubricants.

It is known to use a grease nipple provided with a check valve or non-return valve for this purpose. This valve will allow lubricant or grease to pass from the outside to the inside yet will present a pressure tight block in the opposite direction. Inner pressure is built up due to the lubrication in the space into which the grease nipple opens, and this pressure is reduced only very slowly because of leaks of which the structure is not quite free. In various cases of application, for instance, when a splined shaft connection constitutes the longitudinal compensating means of a universal joint shaft for heavy duty this internal pressure, among others, causes an undesired additional load which must be overcome when pushing together the longitudinal compensating means.

It is the object of the invention to provide a valve of the kind mentioned which not only permits lubrication without any difficulty but also provides for immediate venting of the space into which the lubricant was introduced upon removal of the lubricating device.

Therefore according to the invention a valve is provided wherein a grease nipple is disposed at the valve body and has a first passage, and a second passage is provided connecting the valve chamber with the ambient atmosphere, the outlet opening of the valve being arranged between the openings of the passages into the valve chamber, and a valve ball is provided which is freely movable in the valve chamber and capable of entering into sealing engagement with either one of the seats surrounding the opening of each of the passages in response to pressure admission on said ball.

During the lubricating process the grease pressed through the passage of one of the grease nipples urges the ball against the seat formed at the opening of the second passage so that said second passage is blocked. Upon withdrawal of the grease gun from the grease nipple the pressure built up due to the lubrication in the inner space filled with grease acts through the outlet opening to push the ball from its seat so that both passages are opened. The cross sectional enlargement thus provided permits ready discharge of the excess amount of lubricant pressed in and thus affords a rapid pressure decrease.

In an advantageous development of the invention the second passage is formed in a second grease nipple disposed at the valve body opposite said first grease nipple. This embodiment is particularly advantageous in cases where the splined shaft connection constitutes the longitudinal compensating means of a universal joint shaft and the valve is fitted in the center of the fork of a universal joint. When the splined shaft connection is to be lubricated from the side it is not necessary to turn the universal joint shaft into a certain position because one of the two grease nipples off-set from each other by 180° will always be positioned at that side at which lubrication is to be effected.

In accordance with a further development of the invention an operating member movable in the outlet opening and in the vicinity thereof is provided for the valve ball so as to move the ball precisely in a predetermined direction from its seat when the lubrication is finished. This operating member permits the passing of lubricant in both directions and is movable against the valve ball under pressure acting from the outlet towards the valve chamber. Movement of the operating member in the direction of the outlet is limited by an abutment provided in the outlet opening. The operating member acts like a pressure operated piston. Upon actuation of the operating member by pressure which acts from the outlet in the direction towards the valve chamber, i.e. by internal pressure existing in the space filled by the grease the operating member causes a change of said pressure into a resulting force which is exerted upon the valve ball in such direction as to push the valve ball away from its seat. Advantageously the operating member is likewise designed as a ball, and in a preferred embodiment its diameter is smaller than that of the valve ball and it is guided with clearance over part of its path of movement in the longitudinally slotted end of a sleeve fitted in the outlet opening. The abutment is formed by a seat within the sleeve.

Figure 2:
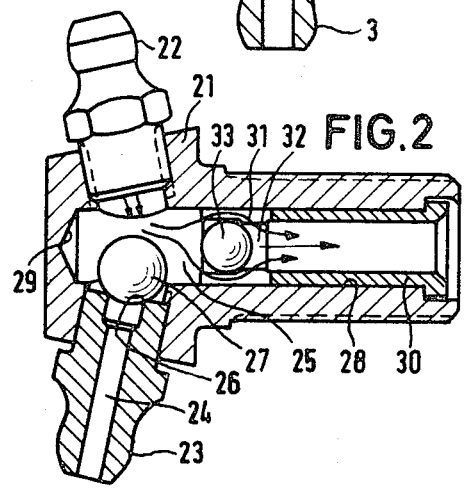
Figure 3:
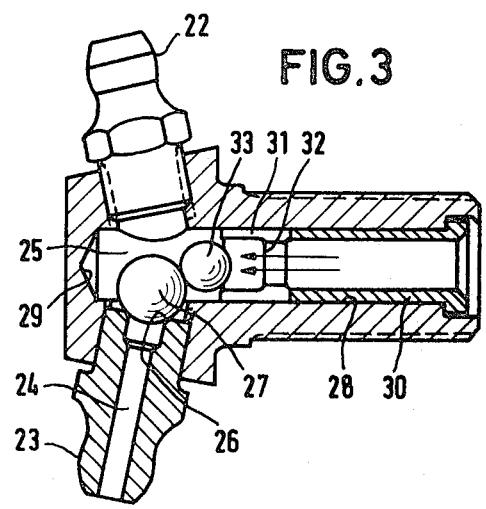
Figure 4:
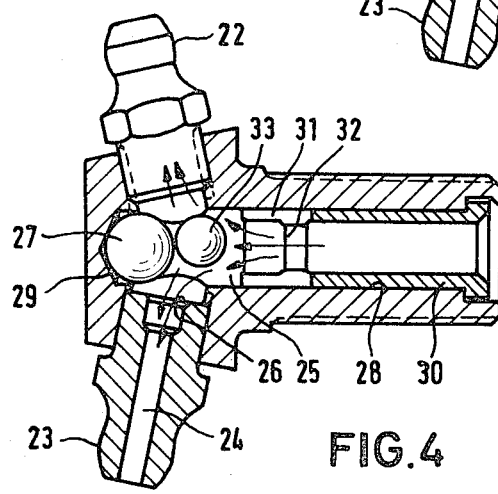

This invention will be illustrated in greater detail in the following description of two embodiments of the invention, along with the accompanying drawings, in which:

FIG. 1 is a sectional elevation showing a first embodiment of a valve of the invention;

FIGS. 2, 3, and 4 are sectional elevations similar to FIG. 1 of a second embodiment of a valve of the invention, showing the valve in three different positions of operation.

The lubricating and air vent valve shown in FIG. 1 comprises two grease nipples 2 and 3 disposed opposite each other at the valve body 1 and each having a passage 4 opening at opposite ends into the valve chamber 5. The openings 6 of the passages 4 are designed as valve seats for a ball 7 which is freely movable within the valve chamber 5. An outlet opening 8 communicates with the valve chamber 5 between said two openings 6. Opposite the entrance into said outlet 8 from said valve chamber 5 an abutment in the form of a blind bore 9, formed in one operation together with the outlet opening 8, is provided for the valve ball 7.

The valve is centered by means of a screw 10 and a copper alloy washer 11 on the fork (not shown) of a universal joint shaft comprising the splined shaft connection as a longitudinal compensating means.

The valve thus described operates as follows: The connecting pipe or hose of a grease gun is slid over one of the nipples 2 or 3. The grease entering the valve chamber 5 through the respective passage 4 presses the ball 7 against the seat at the opening of the other passage 4 so that the grease may flow unobstructedly through the outlet opening 8 into the space to be lubricated. In this space a pressure is built up due to the lubrication. Upon removal of the grease gun this pressure acts back through the outlet opening 8 and presses the ball 7 from its seat 6 against the abutment 9. Thus both passages 4 become free so that grease may flow out of both nipples 2 and 3 in order to release the pressure.

The valve shown in FIGS. 2, 3, and 4 comprises a valve body 21 into which the grease nipples 22 and 23 are inserted opposite each other and at a slight inclination for reasons of space. The grease nipples each have an open passage 24, the opening 26 of which into the valve chamber 25 is designed as a seat for a ball 27. The valve chamber 25 is constituted by one end of the outlet opening 28 of the valve and limited by an abutment 29 for the ball 27 of the valve. A sleeve 30 is inserted into the outlet opening 28. Said sleeve is formed at its end facing the valve chamber 25 with a longitudinal slot 31 and an annular seat 32 for a ball 33. The ball 33 is guided with clearance along the inner circumference of the sleeve 30 in the range of the longitudinal slot 31, movement of the ball 33 towards the outlet being limited by the seat 32.

The functioning of the valve shown in FIGS. 2 to 4 will now be described with the aid of those figures.

FIG. 2 shows the valve while grease or lubricant is being pressed through the passage 24 of the grease nipple 22. The grease presses the ball 27 against the opposite seat 26 of the other passage 24 so as to close said passage. The grease holds the ball 33 in abutment against the seat 32 of the sleeve 30 yet flows around said ball through the longitudinal slot 31 in the direction of the outlet towards the space to be lubricated.

FIG. 3 shows the valve immediately upon withdrawal of the grease gun from the grease nipple 22. The direction of the pressure now is reversed because of the pressure built up in the space provided with the lubricant. The arrows in the outlet opening 28 pointing in the opposite direction are to illustrate this condition. The lubricant flowing in opposite direction through the outlet opening lifts ball 33 from its seat 32 and advances it against ball 27. FIG. 3 shows the valve at the instant at which ball 33 contacts ball 27.

Ball 33 then pushes ball 27 from its seat 26 and towards the abutment 29. There ball 27 is held at the final stage of the operational movement of ball 33, as shown in FIG. 4. At this stage both passages 24 are open for quick pressure compensation.

I claim:

1. A valve for lubricating and venting machine parts subject to wear by a pressurized lubricant comprising grease nipples disposed in a valve body, each having an open passage formed therein and leading to a valve chamber, said open passages connecting the valve chamber with ambient atmosphere; a valve seat surrounding each of said passages in the valve chamber; a valve ball disposed and freely movable within the valve chamber and capable of entering into sealing engagement with either of said valve seats in response to pressure; an outlet opening in the valve body communicating with the valve chamber and disposed between said passages; and an operating member for the valve ball movable in and near the outlet opening and permitting lubricant to pass in both directions and being movable against the valve ball under pressure acting from the outlet towards the valve chamber to move said valve ball away from said passages, the movement of said member in the direction of the outlet being limited by an abutment provided in the outlet opening.

2. A valve as claimed in claim 1 wherein said operating member is a ball.

3. A valve as claimed in claim 2 wherein said operating member ball has a smaller diameter than the valve ball and is guided with clearance over part of its path of movement in a longitudinally slotted end of a sleeve fitted in the outlet opening.

4. A valve as claimed in claim 3 wherein the abutment which limits the movement of the operating member ball in the direction of the outlet is formed by a seat provided in the sleeve.

5. A valve as claimed in claim 4 wherein said valve chamber is provided with an abutment in the form of a blind pore.

* * * * *